Dec. 15, 1942.   T. B. GIBBS ET AL   2,304,813
FREQUENCY DIVIDER
Filed March 12, 1940   3 Sheets-Sheet 1

INVENTORS.
Thomas B. Gibbs
Morris E. Brown
Parker B. Wickham
BY Richardson and Guer
ATTORNEYS.

Dec. 15, 1942.  T. B. GIBBS ET AL  2,304,813
FREQUENCY DIVIDER
Filed March 12, 1940  3 Sheets-Sheet 2

INVENTORS.
Thomas B. Gibbs
Morris E. Brown
Parker B. Wickham

Dec. 15, 1942.   T. B. GIBBS ET AL   2,304,813
FREQUENCY DIVIDER
Filed March 12, 1940   3 Sheets-Sheet 3

INVENTORS.
Thomas B. Gibbs
Morris E. Brown
Parker B. Wickham
By: Richardson and Geer
ATTORNEYS.

Patented Dec. 15, 1942

2,304,813

UNITED STATES PATENT OFFICE 2,304,813

FREQUENCY DIVIDER

Thomas B. Gibbs, Chicago, Morris E. Brown, Oak Park, and Parker B. Wickham, Chicago, Ill., assignors, by mesne assignments, to George W. Borg Corporation, Chicago, Ill., a corporation of Delaware Application March 12, 1940, Serial No. 323,578

9 Claims. (Cl. 250—36)

The present invention relates in general to frequency dividers, and more in particular to frequency dividers which employ a multivibrator or a plurality of multivibrators in tandem, depending on the ratio between the initial frequency and the final frequency. The object of the invention is to produce a new and improved device of this character.

A multivibrator is an oscillator comprising two space discharge tubes having their plates cross-connected by condensers to their grids; that is, the plate of each tube is capacity coupled to the grid of the other tube. Such an arrangement will oscillate at a natural frequency which is determined by the value of the coupling condensers and the grid and plate resistors through which the condensers charge and discharge alternately. The tubes pass current alternately and in each tube the change from the conductive condition to cutoff occurs very suddenly. The output of a multivibrator therefore has a distorted wave form and is rich in harmonics.

The utility of a multivibrator as a frequency divider depends on the fact that it may be controlled by impulses or alternating currents of a higher frequency and can be given an operating frequency thereby which is exactly the same as some sub-multiple of the control frequency. The control voltages may be applied over control circuits which connect with the plates or grids of the multivibrator tubes. If the voltages in the control circuits are in phase the multivibrator operates at some even sub-multiple frequency, while if the voltages in the control circuits are displaced 180 degrees in phase from each other the multivibrator operates at some odd sub-multiple frequency.

One application of the multivibrator as a frequency divider that has been proposed and used to some extent is for the purpose of obtaining a constant low frequency current of 60 cycles or thereabouts which can be used for operating a synchronous motor. Cases are known, as in watch timing apparatus, where it is necessary to operate a motor at a very constant rate. The commercial power supply available is not sufficiently constant for this purpose. On the other hand, the most reliable source of constant frequency, a crystal oscillator, has such a high natural frequency that it is altogether unsuitable for operating a motor. By employing several multivibrator stages, however, operating at successively lower sub-multiple frequencies, the oscillator frequency can be reduced to a frequency such as 60 cycles, thus giving an output that can be amplified and used for the desired purpose. The complete equipment as described, including the crystal oscillator and chain of multivibrators, constitutes a constant frequency generator having a low frequency output.

Such constant frequency generators of the above type as were manufactured and sold prior to our invention were not satisfactory, as the manufacturing cost thereof was excessive and the maintenance expense was very high. These results were due to a number of reasons which will only be briefly mentioned at this point, but which will be explained fully in the course of the general description of the invention.

One cause for the unsatisfactory results was the lack of knowledge of the principles of multivibrator operation and the consequent failure to so proportion the various parts as to obtain the maximum stability of operation. The principal factors having to do with the operation of a multivibrator are the values of the plate and grid resistors, the value of the plate-to-grid coupling condensers and the voltage of the driving or control currents. For the best results each of these values should have a fairly good range of variation in either direction. For example, the value of the grid resistors should be so selected that reasonable variations up or down such as are found in commercial resistors will not affect the operation by causing the multivibrator to fall out at the frequency for which it is designed to operate. Each value, such as value of grid resistors, plate resistors, etc., may be so selected that it has a very wide range of variation by adjusting the other values, but each factor affects all the others, and consequently if the values are so selected that a particular one has the maximum range of variations then the limits on the others are correspondingly reduced. Failure to appreciate this fact and lack of knowledge of the relation between the different factors and of the nature of the effect which a variation in each one has on the others has rendered it impossible heretofore to select the optimum values for all the factors. The invention solves this problem and produces a controlled multivibrator having great inherent stability.

Another reason for the lack of success hitherto has been the use of condenser drive, or condenser coupling between stages. When a single multivibrator is driven from a source of alternating current it is frequently necessary to interpose condensers in the drive circuits, and this has become the standard practice. The same idea has been carried over into the interstage coupling circuits between tandem connected multivibrators, where indeed it appeared to have a special advantage. To explain this briefly, the coupling between a 360 cycle multivibrator driving a 60 cycle multivibrator may be considered. If low capacity condensers are used in the drive circuits, just large enough to pass the required 360 cycle drive voltages, these condensers will have a considerable limiting effect on the feedback of 60 cycle voltages from the second multivibrator to the first. In other words, the condenser coupling scheme utilizes the selective action of condensers in transmitting high frequency voltages better than those of low frequency. For these and other reasons condenser drive has been accepted as inherently desirable and essential. We have discovered, however, that while condensers have certain advantages, the use of resistors in the drive circuits between tandem connected multivibrators gives far better overall results as regards stability of operation. The advantages of condenser coupling are greatly outweighed by the hitherto unperceived disadvantages which it introduces and which are eliminated by using resistor drive. The reasons for the greatly improved results will be fully explained hereinafter.

It has also been the practice heretofore, so far as known, to tune a controlled multivibrator as closely as possible to the sub-multiple frequency at which it is to operate, the theory being that the nearer the multivibrator is tuned to its operating frequency the easier it will be to keep it in step with the control voltages. We have discovered that this theory is a mistaken one. In constructing a controlled multivibrator we pay no attention to the natural frequency, but select the parts with a view to maximum limits at the operating frequency. This results in a multivibrator having a natural frequency which is far lower than its operating frequency. We are able to control such a multivibrator at the desired operating frequency by firing each tube by means of impulses which are amplified in the other tube. This feature is also believed to be new.

Touching briefly on the practical aspects of the manufacture and operation of standard frequency generators using multivibrators, these generators have been strictly a laboratory product. The various limits have been so close that even the very small variation between different tubes of the same type has caused trouble and has made it necessary to check and readjust the values of condensers and resistors in each multivibrator stage. It has been the exception rather than the rule that a complete generator would divide properly in all stages when first tested, and as to those that did operate there was no assurance that some one or more of the variables was not so close to the limit that a slight change would render the whole generator inoperative. Under these conditions, each unit had to receive individual attention in the way of exhaustive testing and adjustment during manufacture thereof, which greatly added to the cost.

From the foregoing it may be surmised that such generators gave trouble in the hands of the customers, which is the fact. The values of condensers and resistors change slightly with the passing of time and the tube characteristics change also. Multivibrators would cease to divide properly after a few months, for unexplained reasons, and the equipment would have to be shipped in to the factory for test and change in capacity or resistor values at the offending stages. In case a tube burned out it happened frequently that the concerned multivibrator would not divide properly after a new tube was installed, which also made factory inspection and adjustment necessary. These difficulties made the maintenance costs prohibitive.

The present invention eliminates the difficulties formerly encountered in the manufacture and maintenance of constant frequency generators and other apparatus employing multivibrators, and brings such equipment into the same category with amplifiers, radio receivers, and other standard electronic apparatus that is manufactured on a production basis.

It is an object of the invention therefore to produce a frequency divider using multivibrators that is adapted for quantity production from the usual engineering specifications, and which requires only ordinary testing to detect actual faults in the parts or wiring thereof.

A further object is to produce a frequency divider using multivibrators that can be sold under the usual guarantees as to performance, and with the assurance that no troubles will develop other than those to which electronic equipment in general is subject.

A further object is to produce a controlled multivibrator adapted for use individually or in tandem with other similar multivibrators in which optimum values are assigned to all condensers and resistors and in which each condenser and resistor therefore has such wide limits that ordinary commercial parts can be used without regard to standard variations in values.

The invention and the various features thereof whereby the above noted objects are accomplished, including the features previously mentioned and others, will be described more in detail hereinafter with reference to the accompanying drawing, in which—

Figure 1:
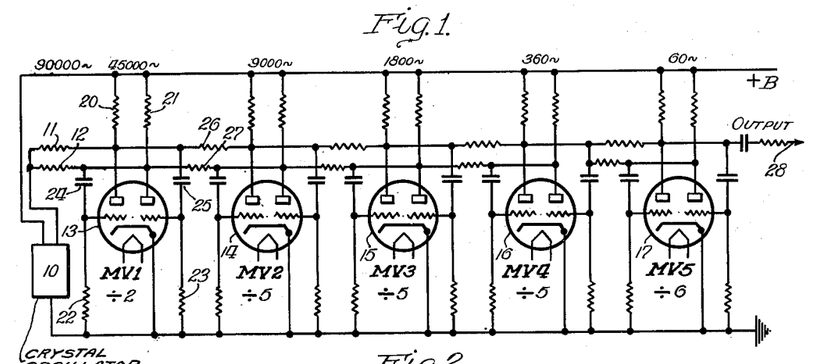
Fig. 1 is a circuit drawing of a standard frequency generator constructed in accordance with the invention and employing five multivibrator stages.

Referring to Fig. 1, the rectangle 10 represents an oscillator of known type comprising a piezoelectric crystal and a space discharge tube. Preferably an amplifier tube is associated with the oscillator tube and the complete assembly is commonly referred to as a crystal oscillator. A suitable oscillator for the purpose is disclosed in the pending application of Thomas B. Gibbs, Ser. No. 123,994, filed February 4, 1937, Patent No. 2,236,532, granted April 1, 1941.

The first multivibrator MV1 comprises the space discharge device or vacuum tube 13 and circuit connections including resistors and condensers as shown. The tube 13 may be a double triode of the type known to the trade as type 6N7. The two plates are connected to the plus B lead, representing a suitable source of positive direct current potential, through resistors 20 and 21. The two grids are connected to ground potential through resistors 22 and 23. The plate of the left hand triode is connected to the grid of the right hand triode through a condenser 25, while the plate of the right hand triode is connected to the grid of the left hand triode through the condenser 24. The cathode is connected to ground. The filament or heater is supplied with current in well known manner, details of which have been omitted in order to simplify the drawings.

The other four multivibrators MV2, MV3, MV4, MV5, comprising tubes 14, 15, 16, and 17 and the associated resistors and condensers, may be identical with the multivibrator MV1, except as to the value of the plate-to-grid coupling condensers, and hence need not be described in detail.

The crystal oscillator 10 is coupled to the first multivibrator MV1 by means of resistors 11 and 12, which are connected between the output lead of the oscillator and the two plates of the tube 13. The arrangement provides two drive circuits, in which the driving voltages are in phase, and hence the first stage multivibrator MV1 is adapted to operate at a frequency which is an even sub-multiple of the oscillator frequency.

The first multivibrator MV1 is coupled to the second multivibrator MV2 by two drive circuits which include the resistors 26 and 27, respectively. These circuits extend to the two plates at the second stage, and since they connect to the two plates at the first stage, driving voltages will be transmitted from the first stage to the second stage, which are 180 degrees displaced in phase in the two circuits. Accordingly the second stage multivibrator MV2 is adapted to operate at a frequency which is an odd sub-multiple of the frequency at which the first stage multivibrator MV1 operates.

The driving or coupling circuits between the second and third stages and between the third and fourth stages are the same as those between the first and second stages, and accordingly the third and fourth stage multivibrators MV3 and MV4 are adapted to operate at odd sub-multiple frequencies. The two drive circuits for the last stage are connected to the same plate at the fourth stage, with the result that the driving voltages in the two circuits are in phase and the last stage multivibrator MV5 is adapted to operate at an even sub-multiple frequency.

The output lead 28 is connected to one of the plates at the last stage multivibrator and may include a condenser and resistor of suitable value. The output may be used for any desired purpose. For example, it may be reduced to a sine wave form and amplified as disclosed in the prior application referred to and used for operating a motor.

The frequencies at which the different stages operate are shown on the drawings, also the division factor at each stage. Thus the oscillator frequency is 90,000 cycles per second, and the first stage multivibrator MV1, dividing by 2, operates at a frequency of 45,000 cycles per second. The second stage multivibrator MV2 divides by 5 and has a frequency of 9,000 cycles per second, and so on. The values of the resistors and condensers are given in the following table:

| | | |
|---|---|---|
| Plate resistors, all stages | ohms | 30,000 |
| Grid resistors, all stages | do | 75,000 |
| Coupling resistors, all stages | do | 250,000 |
| Coupling condensers, first stage | mmf | 110 |
| Coupling condensers, second stage | mmf | 720 |
| Coupling condensers, third stage | mf | .0038 |
| Coupling condensers, fourth stage | mf | .0195 |
| Coupling condensers, fifth stage | mf | .115 |

The values given are suitable for use with tubes of the type previously mentioned and with a wide range of plate potential. A suitable potential is 250 volts. It will be seen that the plate resistors, grid resistors, and drive or coupling resistors are the same at all stages, which greatly simplifies the manufacturing end. The plate-to-grid coupling condensers are of different values at the different stages.

Figure 5:
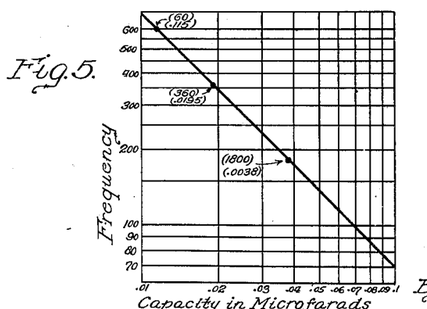
Fig. 5 shows a curve for use in selecting the proper capacity value for causing a controlled multivibrator to operate at any desired frequency.

The proper value of coupling condensers to use at each stage is determined by reference to the curve shown in Fig. 5, where the condenser capacity is plotted against frequency on a logarithmic graph. Thus to determine the value of coupling condensers to use at the fourth stage, which is to operate at 360 cycles, we note where the horizontal line corresponding to 360 cycles intersects the curve, then pick up the vertical line which intersects the curve at the same point, and follow it to the bottom of the figure, where the required capacity is read as .0195 mf.

Although the frequency range covered by the curve extends only from 70 to 700 cycles, the proper condenser value for any lower frequency (7-70) can be found by taking that frequency which when divided by 10 will equal the desired frequency and by then multiplying the corresponding condenser value by 10. For example, to determine the proper condenser value for a frequency of 60 cycles per second, the frequency of 600 is used (600 divided by 10 equals 60) and the corresponding condenser value, .0115 mf., is multiplied by 10 to give .115 mf., which is the required value.

For frequencies greater than 700 cycles per second a similar procedure may be followed. The third multivibrator MV3, for instance, is required to operate at a frequency of 1800 cycles per second. To find the proper condenser value, we use the frequency value 180 (180 multiplied by 10 equals 1800) and locate the corresponding condenser value, which is .038 mf. This value divided by 10 gives the value of .0038 mf., or the required value.

For frequencies higher than about 2000 cycles per second a correction factor must be introduced, because of the distributed capacity of the circuit. This factor is a constant for any given physical arrangement of apparatus and in the particular multivibrator being described it amounts to about 50 mmf. This is such a very small capacity in comparison with the capacity values shown in Fig. 5 that the curve is a straight line; or rather, the departure from a straight line is so small that it cannot be detected, and the curve is arbitrarily drawn as a straight line. As the frequency is increased, the corresponding condenser values become smaller and the ratio of the constant correction factor to the condenser value increases. At somewhere between 1000 and 2000 cycles per second, depending on the scale on which the curve is drawn, the curve begins to depart from a straight line, but not enough to have much practical significance in view of the wide condenser limits which are permissible in a multivibrator constructed in accordance with the invention. For instance, the ascertained condenser value for a frequency of 1800 cycles per second is .0038 mf., which is equal to 3800 mmf. Applying the correction factor and reducing this condenser value by 50 mmf., we obtain the value 3750 mmf. The difference is less than the normal percentage variation in commercial condensers of this size and is well within the permissible limits. As a matter of fact condensers having a capacity of either .0037 or .0038 can be used, since the actual operating limits are much wider apart.

For the frequencies which are substantially higher than 2000 cycles it is, of course, necessary to make a correction. The required capacity for any frequency can be found by first finding the indicated capacity by means of the straight line curve and then subtracting the constant which corresponds to the distributed capacity of the circuit. In practice, however, it is more convenient to use a curve which covers the whole frequency range and which has been corrected in the higher ranges of frequency, thus enabling the condenser value for any frequency to be read directly. Such a corrected curve has not been shown for lack of space, but can readily be constructed from the information given in the foregoing.

It will be noticed that in a frequency versus capacity curve such as is shown in Fig. 5 the product of any frequency and the corresponding capacity is equal to a constant. This holds true, of course, only over the straight line portion of the curve. In the case of the particular curve shown the constant happens to be exactly 7. This constant can be used in place of the curve, if desired, to calculate the capacity corresponding to any desired frequency. Thus 7 divided by 100 equals .07, which is the capacity value corresponding to a frequency of 100.

It should be clearly understood with respect to the curve Fig. 5 that the capacity values ascertained from the curve (or constant) are optimum operating values determined by the invention for controlled multivibrator stages having the other characteristics described, and are not the values which correspond to the natural frequencies at the several stages. It has been the practice in the past to tune each multivibrator stage as nearly as possible to the frequency at which it is required to operate, the control circuits being relied on to slow down or accelerate each stage to keep it in step with the preceding stage, but we have discovered that greatly improved results are secured if the various stages all tend to run too slow and are at all times speeded up or accelerated above their natural frequencies by the control circuits. In designing a controlled multivibrator, that is, one which is to be used as a frequency divider, we therefore entirely disregard the natural frequency at which the multivibrator would operate if uncontrolled, and assign condenser values with a view to optimum operating limits under the controlled condition. The reasons for all this will be more fully explained hereinafter. As a matter of interest, it may be stated that there is a wide discrepancy between the natural frequency of the several multivibrator stages in the described constant frequency generator, Fig. 1, and the frequency at which these stages operate. In the case of the 360 cycle stage, for example, the natural frequency may be around 200 cycles per second.

Figure 4:
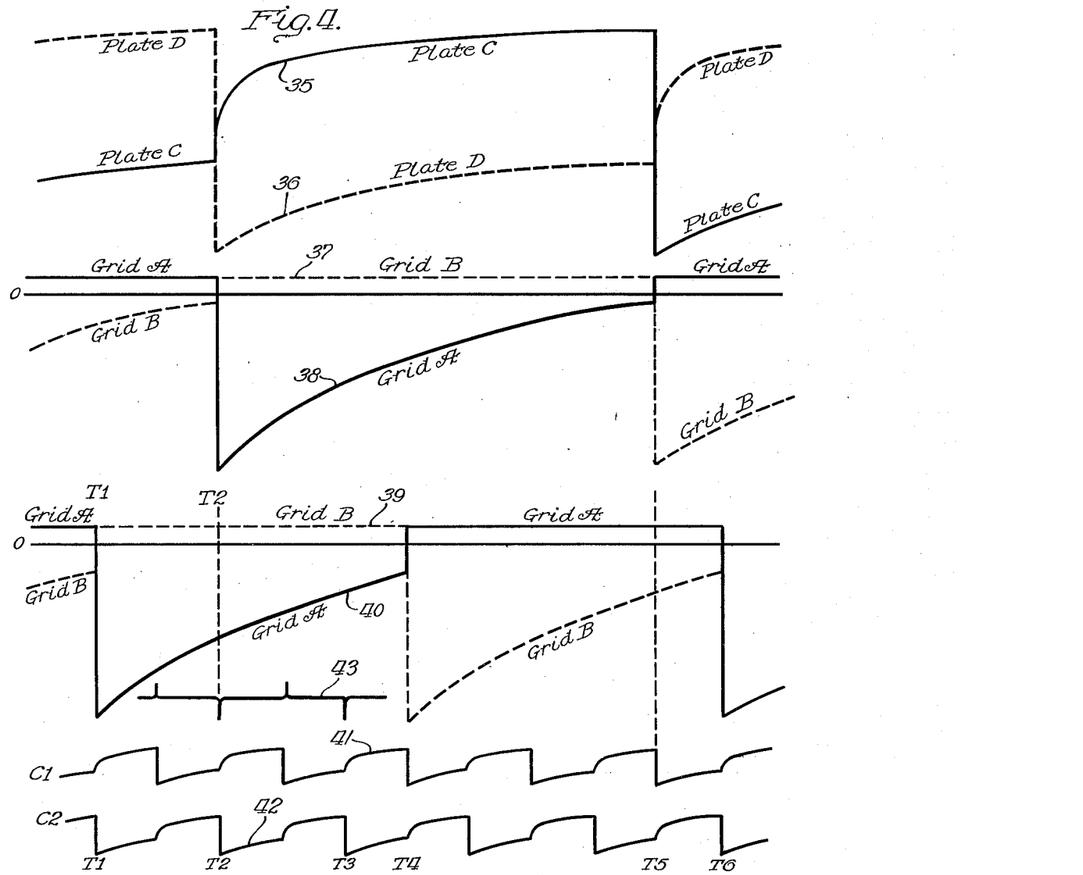
Fig. 4 is a graph showing the grid and plate voltage curves in a multivibrator constructed in accordance with the invention, said figure including also voltage curves for representative control circuits.

It will be desirable now to explain the operation of one multivibrator stage more in detail in order to bring out certain features of the invention, and in particular to facilitate an understanding of the operation and advantages of the resistor drive. For this purpose reference may be had to Figs. 4 and 6. The voltage curves in Fig. 4 are labeled with the same reference letters that are used in Fig. 6, which will enable the discussion to be followed readily. The operation will first be considered with the understanding that no control voltages are being applied to the control circuits $C_1$ and $C_2$ in Fig. 6; that is, the multivibrator is operating at its natural frequency as an uncontrolled oscillator. Although the invention is directed to a controlled multivibrator, it is desirable to consider the free oscillation state before explaining how the control is effected.

Figure 6:
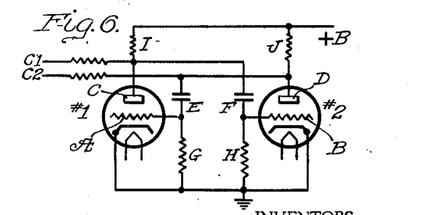
Fig. 6 is a circuit drawing of a multivibrator and control circuits.

In the operation of the multivibrator, Fig. 6, the tubes #1 and #2 alternately pass current and become biased far below cutoff, while the condensers E and F alternately charge and discharge. These phenomena, of course, accompany voltage changes on the grids and plates of the tubes, which are depicted in Fig. 4. Curves 35 to 38, inclusive, are the voltage curves for the free oscillating condition. In the following paragraphs the operation is described briefly, technicalities being avoided as far as possible.

At time $T_1$, the tube #1 is passing current. Grid A of this tube has a substantially constant small positive potential. The condenser E is charging over a circuit which includes the grid resistor G (shunted by the cathode grid circuit of the tube), the condenser E, and the plate resistor J of tube #2. Due to the high resistance of J as compared to that of the cathode grid circuit of tube #1, the grid A cannot go very far positive. See curve 38 at time $T_1$. The plate C of tube #1 has a moderate positive potential, which is rising slowly due to the discharging of condenser F over a circuit which includes the grid resistor H of tube #2 and the cathode plate circuit of tube #1. The potential on plate C is indicated by the curve 35.

At time $T_1$, the tube #2 is not passing current. Grid B is negative, as shown by curve 37, but its potential is slowly rising toward zero or ground potential due to the discharging of condenser F. Plate D has a high positive potential, but has not reached the potential of the plus B lead, due to the charging of condenser E through resistor J, and the resulting drop across the resistor.

The described conditions obtain until time $T_2$ is reached, when grid B approaches near enough to ground potential so that tube #2 can begin to pass current. When tube #2 becomes conductive, the potential on plate D falls, causing a fall of potential on grid A due to the coupling through condenser E. The fall of potential on grid A decreases the current flow through tube #1, which causes the potential on plate C to rise. The rise of potential at plate C raises the potential on grid B, due to the coupling through condenser F, which increases the current flow through tube #2 and causes a further fall of potential at plate D. A kind of regeneration is thus established, which causes the plates and grids of the tubes to undergo great voltage changes almost instantaneously.

Reviewing these changes briefly, the potential on plate D falls with great rapidity to a value fairly close to ground potential, as indicated by curve 36 at time $T_2$. Condenser E being charged, the grid A is driven to a low negative potential, as indicated by the curve 38 at time $T_2$. Tube #1 is biased below cutoff and the potential on plate C rises sharply, as indicated by curve 35. The potential on grid B rises to a low positive value, as shown by curve 37. During the interval from $T_2$ to $T_5$, condenser E is discharging through grid resistor G and the cathode plate circuit of tube #2, this discharge circuit accounting for the extreme fall of potential at plate D. As condenser E discharges, the potential on plate D gradually rises toward an intermediate value determined by the drop across resistor J. The voltage curve for plate D therefore resembles the characteristic discharge curve of a condenser. During this interval condenser F is charging over a circuit which includes the grid resistor H (shunted by the cathode grid circuit of tube #2), the condenser F, and the plate resistor I of tube #1. The resulting drop through resistor I limits the potential on plate C, which rises in a manner similar to a characteristic condenser curve as the condenser F charges. The discharging of condenser E not only influences the potential on plate D as described, but also the potential on grid A which displays a similar rising characteristic.

At time $T_5$ the potential on grid A approaches near enough to ground potential so that tube #1 can begin to pass current. Another regeneration phenomenon is thus initiated, as a result of which grid A goes positive, and tube #1 becomes highly conductive, while grid B goes strongly negative and tube #2 ceases to pass current. The changes which take place are similar to those already described and are shown by the curves 35 to 38, inclusive. The operation continues in this manner, with the two tubes functioning alternately in the manner described.

The rate at which the regenerative phenomena, sometimes referred to as "transients," take place is determined by the rate at which the condensers charge and discharge, which in turn is determined by the capacity of the condensers and the value of the grid and plate resistors. Since the condenser circuits also include tube elements, in one case a cathode grid circuit and in another case a cathode plate circuit, the rate is also influenced somewhat by the tube characteristics. This fact helps to explain the difficulties formerly encountered as the result of changing tubes. It may be noticed also that at times $T_2$ and $T_5$ the grids B and A, respectively, are rising in potential quite slowly, as the grid curves are nearly parallel with the zero axis at these points. This indicates an unstable condition, in which extremely minute changes can delay or accelerate the firing of the tubes, and explains the somewhat erratic behavior of a multivibrator when oscillating without outside control.

The operation of the multivibrator, Fig. 6, under the action of control voltages applied to the control circuits $C_1$ and $C_2$ will now be explained. It will be obvious that the multivibrator is susceptible to control at the times when the grids are approaching very close to ground potential, that is, at the times $T_2$ and $T_5$, and the general practice heretofore has been to effect control substantially at these points. For instance, if a positive control voltage is applied to grid B over control circuit $C_1$ at time $T_2$, there will be a tendency for the tube #2 to fire at this point, and similarly tube #1 can be fired at time $T_5$ by a positive potential on control circuit $C_2$. For various reasons this method of control is unsatisfactory, however. We have discovered that far better results are secured by arranging the circuit constants so that the tubes can amplify at the times when control is to be exercised and by firing each tube by negative impulses on the control circuit associated with the other tube.

The manner in which the foregoing is carried out will be explained with reference to the grid voltage curves 39 and 40 and the control circuit voltage curves 41 and 42, Fig. 4. The grid voltage curves 39 and 40 are similar to curves 37 and 38, except that the time interval between successive transients is greatly decreased, due to the pronounced difference between the natural frequency of the multivibrator and its operating frequency. The control circuits $C_1$ and $C_2$ are assumed to be connected to another multivibrator, as shown in the case of the multivibrators at the first two stages in Fig. 1, and the voltages impressed on the control circuits are the plate voltages at the preceding stage. The control voltage curves therefore resemble the plate voltage curves such as curve 35 in Fig. 4. Since the two control circuits connect, respectively, with the two plates at the preceding stage, the control circuit voltages are 180 degrees out of phase, and the controlled multivibrator divides by an odd integer. Curves 39—42 show division by 5.

Proceeding with the explanation, at time $T_1$ tube #1 is passing current, while tube #2 is non-conductive. The grid B is at a negative potential, rising toward ground potential, but it has not yet reached sufficiently close to ground potential to enable the tube to begin to pass current. In fact, it has not even approximately reached this condition, as can be seen from curve 37. The grid is, however, in a condition where it can be effectively controlled. As can be seen from curves 41 and 42, the potential on control circuit $C_1$ rises at time $T_1$, while the potential on control circuit $C_2$ drops almost instantly to a minimum value, these changes being due to a transient at the preceding stage. It will be convenient to refer to these changes as positive and negative impulses.

The positive impulse on control circuit $C_1$ raises the potential on grid B, due to the coupling through condenser F. The negative impulse on control circuit $C_2$ lowers the potential on grid A, due to the coupling through condenser E. Tube #1 is passing current at this time and is in amplifying condition, with the result that an amplified rise in potential is produced at plate C, which is transmitted to grid B through condenser F. The two impulses therefore produce a cumulative effect on grid B, although the effect of the amplified negative impulse, translated to a positive impulse in tube #1, is much the greater. The potential on grid B is thus raised to ground potential, or sufficiently near thereto so that tube #2 can pass current and a transient takes place.

The foregoing explains rather briefly how grid B is controlled. A more detailed discussion will be given later. Grid A is controlled in a similar way, except that the control is effected by means of a negative impulse on control circuit $C_1$ and a positive impulse on control circuit $C_2$. At a time halfway between times $T_2$ and $T_3$ the voltages in the control circuits are right, but the grid A is still too far negative to enable control to be effected. At time $T_3$ the impulses received over the control circuits tend to make grid A more negative, which prevents the multivibrator from undergoing a transient at this point. Thus the positive impulse on control circuit $C_1$ is amplified in tube #2 (now passing current) and is transmitted to the grid A as a negative impulse. At the same time grid A is receiving a negative impulse over control circuit $C_2$. Tube #1 therefore cannot fire time $T_3$.

When time $T_4$ is reached, the control circuit voltages are again correct for firing tube #1 and grid A has approached near enough to ground potential for the operation to be effected. The negative impulse on control circuit $C_1$ is converted to an amplified positive impulse in tube #2, raising the potential on grid A. At the same time grid A receives a positive impulse over control circuit $C_2$. The rise in grid potential causes tube #1 to pass current and the transient takes place.

The operation continues as described. At time $T_6$ the controlling impulses are effective to fire tube #2 again by raising the potential on grid B. Tube #1 fires 2½ cycles later, in terms of the control voltages, due to a rise in potential on grid A, and so on.

The manner in which the control voltages function when the controlled multivibrator is operating at an even submultiple may now be briefly explained. For this purpose the curve $C_1$ should be shifted one-half cycle or 180 degrees to the left so as to bring the control voltages in the two control circuits in phase. The positive and negative impulses in one circuit will then coincide as to time with the positive and negative impulses in the other circuit.

At time $T_1$, a negative impulse is received on control circuit $C_1$, which tends to lower the potential on grid B. At the same time, a negative impulse is received over control circuit $C_2$, which lowers the potential on grid A. The potential on plate C therefore rises, and an amplified positive impulse is transmitted to grid B through condenser F. The latter impulse is somewhat reduced by the negative impulse received over control circuit $C_1$, but still has several times the amplitude of the original impulse and is sufficient to cause tube #2 to start.

At a time one-half cycle later than time $T_2$, when the negative potential on grid A is rising, positive impulses are received over both control circuits. The impulse on control circuit $C_2$ tends to raise the potential on grid A. The impulse received over $C_1$, however, is converted into an amplified negative impulse by the action of tube #2 and the result is that the potential on grid A is reduced. Tube #1 therefore cannot undergo a transient at this time.

At time $T_3$, negative impulses are again received over both control conductors. The negative impulse on $C_2$ tends to lower the potential on grid A. The negative impulse on $C_1$ is converted into an amplified positive impulse at tube #2, which raises the potential on grid A considerably in spite of the negative impulse received over $C_2$. Thus tube #1 undergoes a transient at time $T_3$. The multivibrator divides by 4 instead of by 5. This is true, of course, only if the grid potential has risen sufficiently at time $T_3$ to permit the amplified negative impulse on $C_1$ to initiate the transient; and if it has not, then the transient will occur at a time which is one-half cycle later than time $T_4$, and the multivibrator will divide by 6. The transient cannot occur at time $T_4$ for the same reason that it cannot occur at a time one-half cycle later than time $T_2$.

It will be noticed that, although the control is exercised in the case of both odd and even divisions by means of negative impulses which are converted into amplified positive impulses, the theoretical effectiveness of the control differs in the two cases because of the fact that during division by an odd integer the amplified impulse is aided by the impulse on the other control conductor, whereas during division by an even integer the amplified impulse is opposed by the impulse on the other control conductor. This would lead one to suppose that a multivibrator operating at an odd sub-multiple frequency is inherently somewhat more stable than one operating at an even sub-multiple frequency, a supposition which is confirmed by experimental proof. We have found that although the stability limits progressively decrease with the increasing values of the division integer, a multivibrator dividing by 7 is inherently as stable, if not slightly more so, than a multivibrator which is dividing by 6. A multivibrator dividing by 4, however, is fully as stable as one dividing by 5. These facts support the conclusion that the control impulses are amplified to a considerable extent, at least as much as three or four times.

It has been stated previously that the use of resistors in the control circuits in place of the low capacity condensers formerly used affords greatly improved operating results. The use of condensers cannot be blamed for all the troubles formerly met with, but we have found, nevertheless, that even if the condenser coupling is given the advantage of all other improvements it is still manifestly inferior to resistor coupling. That is, with all other operating conditions identical, the resistor drive is distinctly better than condenser drive. One reason for this may be pointed out in connection with a somewhat more detailed discussion of the initiation of a transient by a negative control impulse.

Reverting to the previous explanation of how a transient is initiated at tube #2, at time $T_1$ a negative impulse is received over $C_2$, which lowers the potential on grid A and raises the potential on plate C. An amplified positive impulse is thus transmitted to grid B through condenser F, which raises the potential on grid B. If tube #2 now starts to pass a little current, as is assumed to be the case, the potential on plate D falls, which further lowers the potential on grid A, which in turn causes a further rise in potential at plate C. Thus another positive impulse is transmitted to grid B which, due to the time constants of the circuit, will be slightly out of phase with the time of origin of the first impulse. The first impulse still persists, however, as can be seen from the shape of the curve 42 at $T_1$, and the second impulse is superimposed on the first, with the result that the two are added insofar as the effect on grid B is concerned. Thus the initiation of the transient is insured.

When condenser drive is used the wave shape of the impulses delivered to the controlled multivibrator is altogether different, being substantially as shown in curve 43. Each impulse is exceedingly short and appears on the oscillograph as a fine line substantially throughout. When a negative impulse of this character is received at time $T_1$ over control circuit $C_2$, it is converted to an amplified positive impulse in tube #1, and therefore raises the potential at grid B. If tube #2 now passes a small amount of current the potential on plate D falls, the potential on grid A falls, and the potential on plate C rises, with the result that a second positive impulse is transmitted to grid B as in the previous case. Also as in the previous case, the second impulse is displaced in phase from the first impulse, but whereas in the first case this was immaterial because of the persistence of the first impulse, the phase displacement now causes the second impulse to occur after the first impulse has disappeared and no cumulative effect is secured. Other impulses follow, but they are of decreasing amplitude due to losses in the circuit and to the fact that they are not superimposed at any point, and the train of impulses may die out before enough current starts to flow in tube #2 to actually initiate the transient. With resistor coupling, on the other hand, the impulses of the train generated by the starting impulse are cumulative and starting of the tube is insured if it begins to pass any current at all.

It should be understood that in the normal operation of a controlled multivibrator constructed in accordance with the invention the somewhat complicated sequence of operations described in the foregoing does not take place, for the amplified positive impulses into which the controlling negative impulses are converted are of entirely adequate amplitude to initiate the transients. It is only when one of the constants such as resistor or capacity value is approaching its limits due to changes in value with time, etc., that the feature becomes of importance. At such times the resistor coupled multivibrator will continue in satisfactory operation while the condenser coupled multivibrator will fail. In other words, the effect of the resistor coupling is to increase the limits and to thereby improve the stability.

The improvement noted is obtained without sacrifice of any other advantages. For example, one advantage that has been claimed for condenser drive is the prevention of phase shifts in the controlled multivibrator, which is accomplished by converting the more or less square topped waves produced by the controlling multivibrator into very short definitely timed impulses. Such phase shifts might indeed occur if the positive impulses were used, but we employ the negative impulses which are exceedingly sharp and definite in point of time. Phase shift cannot possibly occur therefore. Another claimed advantage of condenser drive which was mentioned hereinbefore is the selective action of the condensers in passing the high frequency driving impulses more readily than the low frequency impulses produced at the controlled multivibrator, which reduces the effect of the latter impulses on the preceding stage. To obtain any great advantage in this way rather small condensers must be used, which progressively decrease in capacity as one proceeds from the lowest frequency stage to the higher frequency stages. At the highest frequency stage the theoretically correct capacity is so small that it has a value not far above the distributed capacity in the apparatus, and it is very difficult to secure or maintain a capacity coupling of definite value at this stage. This particular feature of condenser coupling is therefore not of any great importance. We have found that with resistor coupling there is a slightly greater feedback from a controlled stage to the preceding stage than there is when condenser coupling is employed, but the inherent stability of the preceding stage (also resistor drive) is so much better that the overall stability is greatly improved. In other words, the stability gain in other directions which results from resistor drive is much more than sufficient to compensate for the loss due to feedback.

Before leaving the particular subject of control, the reason why we operate a controlled multivibrator at a frequency much higher than its natural frequency may be further explained. It may be assumed for this purpose that the multivibrator, Fig. 6, is so adjusted or tuned that one-half period is equal to the time $T_1$—$T_4$ instead of the time $T_2$—$T_5$. The multivibrator will then undergo transients automatically at times $T_1$, $T_4$, etc. The natural frequency of the multivibrator cannot be exactly correct, however, and it will tend to oscillate too slow or too fast. If too slow, it will be speeded up by the control impulses and will be kept in step in the manner already described. If it tends to run too fast, it will gain on the control impulses and will fire at times successively farther in advance of times such as time $T_4$ until prevented from gaining any more by the inhibiting effect of the impulses received at times such as time $T_3$. The multivibrator will then continue to undergo regular transients somewhere between time $T_3$ and time $T_4$ and corresponding times along the curves, or at least one might think it would do so from the considerations pointed out thus far. Indeed with careful adjustment and under proper conditions a multivibrator can be made to operate in this way; that is, it can be controlled at a lower frequency than its natural frequency.

It will be appreciated, however, that when the multivibrator has such a high natural frequency that it tends to gain on the control impulses, the grids will be in condition for control at times quite far in advance of the times at which the transients take place, which means that there is danger of skipping a whole cycle of control voltage. In other words, the multivibrator is on the border line of the next lower division and if dividing by 5 will be in danger of changing over to a division by 3. This is a condition that is brought about by the fact that the set of inhibiting impulses which are relied on to slow down the controlled multivibrator are always preceded by a set of impulses which will cause it to fire if conditions are right. The margin is rather close in any event and with strong drive impulses such as we prefer to use for other reasons is practically non-existent. We therefore operate controlled multivibrators at a considerably higher frequency than their natural frequency so that the control impulses are always employed for positively initiating the transients.

Attention may now be directed more specifically to the limits feature of the invention, which is of primary importance in constructing a multivibrator characterized by stability and freedom from trouble under changing conditions. As previously indicated, in a multivibrator embodying the invention the different parts such as resistors and condensers are correlated with the object of securing the optimum limits for each. In other words, the values of the different parts are selected with a view to the best overall operating stability and no part is unduly favored as to its limits to the detriment of any of the other parts.

To enable this feature to be better understood reference may be made to Figs. 7 to 12, inclusive, which grows graphs such as may be used to investigate the operating limits of a multivibrator, The manner in which the curves depicted in these figures are made will first be explained.

Figure 7:
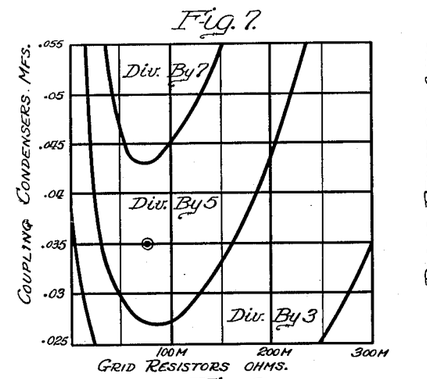
Figs. 7 to 12, inclusive, are graphs which show the various operating limits of a controlled multivibrator constructed in accordance with the invention.

In Fig. 7 different grid resistor values are plotted against different plate-to-grid coupling condenser values. To determine the points on the curves, a standard multivibrator constructed according to the invention and adapted to operate at a frequency of 200 cycles per second is driven from a similar multivibrator operating at 1000 cycles per second and driven from any suitable constant frequency source. The 200 cycle multivibrator divides by 5. The plate resistors and interstage coupling resistors of the 200 cycle multivibrator have the values which have been given in connection with Fig. 1. Two variable capacities are used as the plate-to-grid coupling condensers and two variable resistances function as grid resistors. An oscillograph is used to determine the frequency at which the controlled multivibrator operates, the vertical deflecting plates being connected to a 1000 cycle source of sweep potential, while the horizontal deflecting plates are connected to the output of the controlled multivibrator. The number of horizontal incursions of the ray during each vertical incursion will then indicate the rate of division.

With the apparatus set up as described, the points on the curve are determined by settling the variable capacities at different values and then ascertaining the range of grid resistor values within which the multivibrator will divided by 5. For example, if the condenser value is .035 mf., the value of the grid resistors has to be increased to 30 thousand ohms before the multivibrator will begin to divide by 5. In a range of grid resistor values below 30 thousand ohms it divides by 3. As the value of the grid resistors is increased beyond 30 thousand ohms-the multivibrator continues to divide by 5 until the resistor values exceed 160 thousand ohms, when the multivibrator again begins to divide by 3. Other points on the curves are found in the same way, and after a sufficient number of points have been found the curves can be drawn in. From the manner in which the points are determined, it will be understood that the two curves which form closed loops within the figure define an area within which the multivibrator will divide by 5. With condenser and resistor values which determine points outside the curve which marks the lower boundary of the area, the multivibrator will divide by 3, while with values which determine points inside the curve which defines the upper boundary of the area the multivibrator will divide by 7. A point determined by a condenser value of .026 mf. and a resistor value of 100 thousand ohms, for instance, lies in the division by 3 area, while a point determined by a condenser value of .05 mf. and a resistor value of 100 thousand ohms lies in the division by 7 area. The significance of the shape and size of the division by 5 area will be commented on later.

Figure 8:
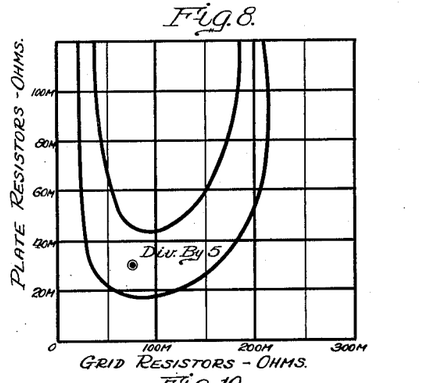

The curves in Fig. 8 are made in the same way as just described, except that in the case of Fig. 8 the grid resistor values are plotted against plate resistor values and the points on the curves are determined by ascertaining the grid resistor limits within which the multivibrator will divide by 5 for different plate resistor values. The coupling condensers, of course, have a value of .035 mf. With values of grid and plate resistors which determine any point within the area defined by the two curves the multivibrator will divide by 5.

Figure 10:
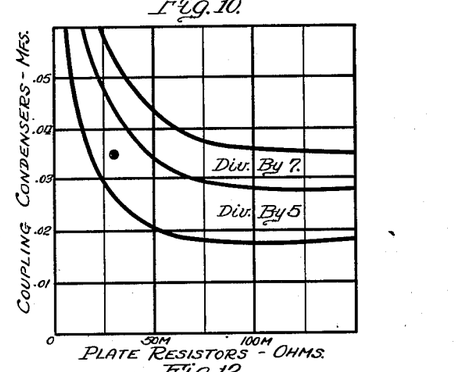

The curves in Fig. 10 are also made in the same way as those in Fig. 7, except that plate resistor values are plotted against condenser values. As in the previous two cases, the area defined by the two curves is the division by 5 area.

Figure 9:
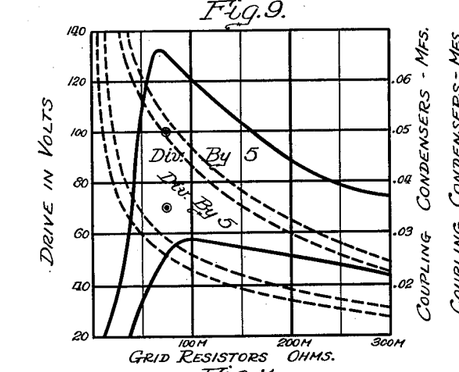
Figure 11:
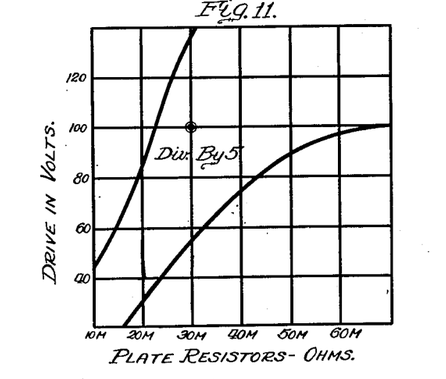
Figure 12:
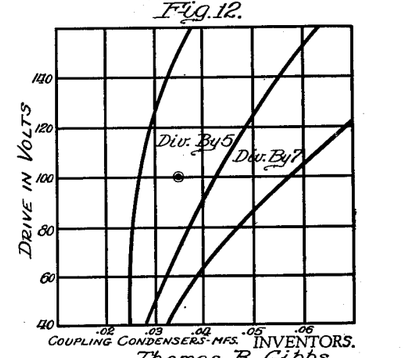

In Figs. 9, 11 and 12 the grid resistor values, plate resistor values and condenser values, respectively, are plotted against the drive in volts. The curves in these figures are constructed in a somewhat different manner. The essential things that we are interested in are the resistor and condenser limits for various drive impulse voltages delivered at the plates or grids of the controlled multivibrator, but it is inconvenient to measure these voltages. The value of the interstage coupling resistors is a function of the delivered drive voltages, but coupling resistors of low value cannot be used because of the increased feedback into the preceding stage. In this dilemma resort is had to an expedient which is effective for the purpose. It is known that ample drive is desirable from the standpoint of the driven multivibrator. The drive is increased by decreasing the size of the interstage coupling resistors, but it has been determined experimentally that the value of these resistors cannot be reduced very much below 250 thousand ohms without deleterious effect on the preceding multivibrator. A value of coupling resistor such as 250 thousand ohms is therefore selected arbitrarily and the grid resistor limits (or other limits) are determined by the method illustrated in Fig. 7. The controlled multivibrator is then run from a variable voltage generator and the applied voltage is adjusted until the grid resistor limits are the same as before, at which time it may be assumed that the voltage of the generator is the same as the effective voltage of the multivibrator previously used. In this way it may be determined that the effective voltage applied to the control circuits by a multivibrator operating with a plate voltage of 250 volts is about 100 volts. The voltage of the variable voltage generator may then be adjusted to different values above and below 100 volts and for each value the grid resistor limits may be determined, thus fixing the location of points from which the heavy line curves in Fig. 9 are constructed. Needless to say, the generator must be of such a character that it is not affected by the feedback from the multivibrator.

The curves shown in Figs. 11 and 12 are constructed in the same way, except that the limits of the plate resistor values and the condenser values, respectively, are determined.

The curves shown in Figs. 9, 11 and 12 could be constructed in other ways. For instance, means could be arranged for varying the plate voltage at the driving multi-vibrator, which would vary the drive voltages applied to the control circuits. This method will give equivalent results over a considerable range. The method first described, however, will be found satisfactory.

The curves shown in the several Figures 7 to 12 are typical limit curves for a multivibrator such as described herein and illustrated in Fig. 1, and show that all the limits are ample, perhaps not absolutely the best that could be obtained, but entirely satisfactory. In the case of each figure, the point determined by the recommended values of the variables is indicated by a small circle. A consideration of the location of these circles will enable one to appreciate the meaning and utility of the curves.

To illustrate, in Fig. 7 the location of the circle is determined by the value of grid resistor used in practice, which is 75 thousand ohms, and by the capacity value which corresponds to a frequency of 200 cycles per second, which the curve in Fig. 5 shows to be .035 mf. The point thus located is well within the division by 5 area in all directions, thus showing excellent limits for both condensers and grid resistors. The capacity can in fact be varied from about .027 mf. to above .042 mf. without changing the division factor, while the value of grid resistors can be varied between 30 thousand and 160 thousand ohms. These are much larger variations than are found in commercial condensers and resistors. It will be noted that the coordinates of the circle are such that it is located in that part of the division by 5 area which lies below the tip of the division by 7 area rather than in one of the side branches, which we have found to be an important consideration.

In Fig. 8 the circle representing the correct operating values is located by the coordinates 30 thousand and 75 thousand, which correspond to the recommended values for the plate and grid resistors, respectively. As in Fig. 7, this location is well within the division by 5 area and is approximately the best location as regards the limits of the variables concerned. The plate resistor range is from 16 thousand ohms to 44 thousand ohms, while the grid resistor range is from about 35 thousand ohms to over 150 thousand ohms.

In Fig. 10 the circle is again located by the coordinates which correspond to the recommended values, 30 thousand ohms for the plate resistors and .035 mf. for the coupling condensers. These coordinates locate the circle advantageously within the division by 5 area. The limits are larger than would appear at first glance, since a different scale is used, and are approximately the same as the corresponding limits shown in Figs. 7 and 8. That is, the coupling condenser limits are approximately the same, whether plotted against the grid resistors or the plate resistors, while the limits for each resistor are about the same, whether plotted against the other resistor or the condensers.

In Figs. 9, 11 and 12 another factor, the drive voltage, is introduced, and the curves define areas which indicate the limits of resistor and condenser values for different drive voltages. As in the case of Figs. 7 to 9, circles are used to indicate the recommended values for the two factors concerned in the case of each figure and represent approximate optimum values.

Discussing Fig. 9 briefly, it has been explained previously that it is not desirable to use resistors in the control circuits which have a value of much less than 250 thousand ohms, in view of the difficulties which would be encountered due to feedback between stages. This is a somewhat arbitrary limit that is placed on the resistors. They could be increased in value, if there would be any advantage in doing so, but they cannot be decreased in value appreciably. As also previously explained, the applied drive voltages actually obtained at the driving multivibrator is about 100 volts. This value is therefore taken as one of the coordinates, the other being determined by the grid resistor value, which is 75 thousand ohms. The circle thus located has an excellent position within the division by 5 area, which as previously mentioned is defined by the heavy line curves.

The circles are located in Figs. 11 and 12 in the same way, taking 100 volts as the drive voltage in each case, the value of 30 thousand ohms for the plate resistors in Fig. 11, and the value of .035 mf. for the condensers in Fig. 12. Again the positions of the circles within the division by 5 areas indicate highly satisfactory limits. It is possible that the value of 100 volts for the drive voltage represents a slight compromise, as will be noticed by comparison of Figs. 9 and 12. The first of these figures seems to indicate that the limits as regards the grid resistors could be improved by reducing the drive slightly, which could be done by using somewhat larger coupling resistors. Fig. 12, however, shows that any reduction in drive would reduce the limits on the coupling condensers. The limits shown are quite satisfactory as a matter of fact, and there is little to be gained by any change.

The curves and the division areas defined thereby demonstrate that a multivibrator constructed according to the principles of the invention has inherent stability due to wide operating limits of all the factors involved, and show further that unless all these factors are properly coordinated in the design reliable results cannot be attained.

Fig. 9 also shows a set of curves in dotted lines which were made under the same conditions as the curves in Fig. 7, except that condenser drive was substituted for resistor drive. That is, the resistors in the interstage control circuits were removed and replaced by condensers. Grid resistor values are plotted against coupling condenser values, as in Fig. 7, but the resulting curves are shown in Fig. 9 rather than in Fig. 7 to avoid possible confusion.

It will be noted from the location of the circle (coordinates .035 mf. and 75 thousand ohms) that fairly good limits are shown, but it will be seen also that the division by 5 area is defined on each side by two lines instead of one. Each pair of lines defines an area in which the multivibrator may or may not divide by 5. There is no clean-cut line of division between the different adjacent division areas, and results in general are not reproduceable. This is a characteristic of curves made when using condenser drive and helps to explain its unsatisfactory operation in practice.

Figure 2:
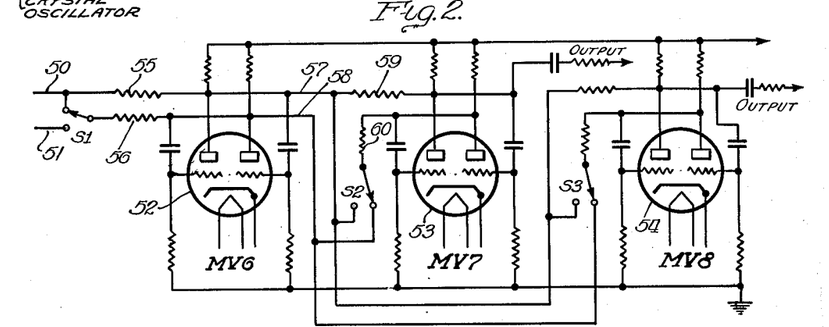
Fig. 2 is a circuit drawing of a frequency divider in which two multivibrators are driven in parallel from another multivibrator and in which switching means is employed for causing the multivibrators to operate on either odd or even sub-multiple frequencies.

Reference may now be made to Fig. 2, which shows two multivibrators MV7 and MV8 driven in parallel from a preceding multivibrator MV6, each multivibrator being provided with means for switching the control circuits to enable either an odd or even division to be made. The object of the arrangement is to secure outputs of different frequencies at will.

The reference characters 50 and 51 indicate two control conductors carrying control voltages which are 180 degrees out of phase and having a frequency of 720 cycles per second. These control voltages may be derived from a preceding multivibrator operating at a frequency of 720 cycles per second. The arrangement may include a crystal oscillator operating at a frequency of 90,000 cycles per second and three multivibrator stages each dividing by 5.

The multivibrator MV6 comprises a double triode 52 and associated resistors and condensers, as shown. The two control circuits include the resistors 55 and 56. One control circuit is permanently connected to incoming control conductor 50, while the other control circuit is provided with a switch S1 by means of which it may be connected to either conductor 50 or conductor 51.

The multivibrator MV7 comprises tube 52 and associated resistors and condensers. The control circuit including resistor 59 is connected to conductor 57 outgoing from MV6. The control circuit which includes resistor 60 is arranged by means of a switch S2 so that it can be connected either to conductor 57 or to conductor 58.

The multivibrator MV8, including the tube 54, is similar to the multivibrator MV7 and has a similar arrangement of control circuits including the switch S3.

As previously mentioned, the switches which are associated with the control circuits of the multivibrators permit the same to be controlled so as to divide odd or even as desired. In the case of switch S1, for instance, when the switch is in the position shown, the voltages in the control circuits of MV6 will be in phase, since both control circuits are connected to conductor 50, and multivibrator MV6 will divide even. Switch S2, however, is shown in the proper position to cause an odd division at MV7, and the same is true as regards switch S3 and MV8.

The multivibrator MV6 divides either by 2 or by 3 and to this end has a normal operating frequency as determined by the size of the coupling condensers of approximately 330 cycles per second. The natural frequency is below 240 cycles per second, the frequency at which it operates when dividing by 3, so that the control impulses exercise control by speeding up the multivibrator, regardless of the rate of division. The multivibrator MV7 divides by 3, 4, or 5, depending on the control frequency received from MV6 and on the position of switch S2. The normal operating frequency of MV7 is about 80 cycles per second, and the natural frequency is below 60 cycles per second.

The following table shows the frequencies at which the multivibrators operate under different control conditions as determined by the positions of the switches S1 and S2. The numeral which is found in parenthesis before each frequency value indicates the rate of division.

| Input | MV6 | MV7 |
|---|---|---|
| 720 | (2) 360 | (4) 90 |
|  |  | (5) 72 |
|  | (3) 240 | (4) 60 |
|  |  | (3) 80 |

The above table shows that the arrangement including MV6 and MV7 provides for four different output frequencies any desired one of which can be obtained by the proper positioning of the switches S1 and S2. With the switches in the position shown, MV6 divides by 2 and MV7 divides by 5, giving an output of 72 cycles per second. If switch S2 is changed to its alternate position, MV7 divides by 4, giving a 90 cycle output. If switch S1 is changed to its alternate position, MV6 divides by 3 and operates at 240 cycles per second instead of 360 cycles per second. MV7 then divides either by 4 or 3, depending on the position of switch S2, and has an output of either 60 or 80 cycles per second.

The multivibrator MV8 may be the same as MV7, with the result that two desired frequencies such as 90 and 72 cycles per second, or 60 and 80 cycles per second, can be obtained simultaneously.

The arrangement of Fig. 2 illustrates the highly positive and reliable control which is accomplished by the invention, as well as the wide limits which the multivibrators have when operating at their optimum frequencies. The multivibrator MV7, for instance, when operating at frequencies of 60 or 90 cycles per second, will obviously have poorer limits than when operating at an intermediate frequency of 72 or 80 cycles per second, but the fact that it will operate satisfactorily over this wide range indicates the wide limits which it has at its best normal operating frequency. We believe that the wide range covered can be attributed in a large measure to resistor coupling between stages, as we have not been able to obtain at all comparable results with condenser coupling.

The arrangement of Fig. 2 in which two multivibrators such as MV7 and MV8 are driven in parallel from a preceding stage is also useful without the switching arrangements for changing the division from odd to even, or vice versa. For instance, MV7 may be arranged permanently for even division by 6, while MV8 is arranged for odd division by 5, thus giving highly useful frequencies of 60 and 72 cycles per second. The same result could be secured by employing only one multivibrator and a switch for causing it to divide by either 5 or 6, but the former arrangement has wider limits for each multivibrator and is more reliable.

It might be expected that where two multivibrators are driven in parallel from a preceding stage, as in Fig. 2, there would be an interaction or coupling between the two driven stages, which would prevent them from dividing at different rates, as by 5 and 6. This indeed is the case when condenser coupling is employed between the driving and driven stages, and buffer tubes have to be inserted. With resistor coupling, however, we have found no appreciable difference in the operation at the driven stages, as each stage operates normally the same as it does when driven separately. At the driving stage there is a slight reduction in the limits, probably due to increased feedback when two multivibrators are being driven instead of one.

Figure 3:
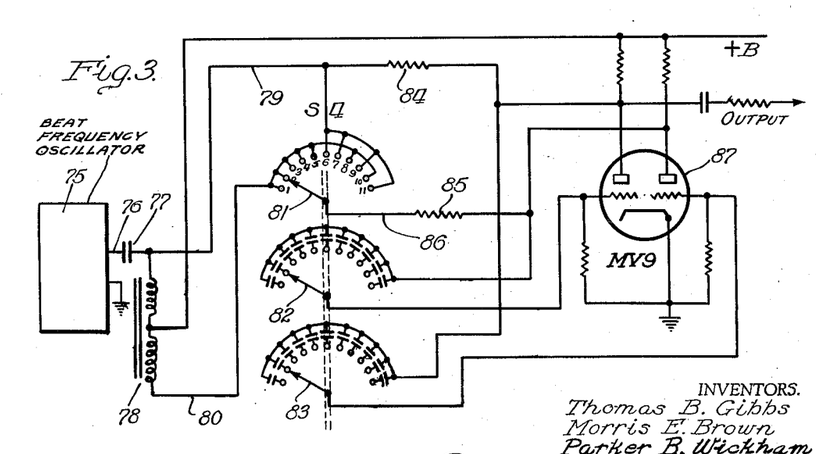
Fig. 3 is a circuit drawing of apparatus for producing any desired output frequency within a predetermined range, the output frequency being of extreme accuracy.

Referring now to Fig. 3, the equipment there shown may be considered as embodying a further development of the basic principles disclosed in Fig. 2. Switching apparatus is used for simultaneously shifting the control circuits for odd or even division and for varying the coupling capacity so as to cause a multivibrator to divide over a range extending from 2 to 9. The specific object of the arrangement shown is to secure any desired output frequency within a range of 40 to 250 cycles per second and with an extremely high degree of accuracy.

The reference character 75 represents a beat frequency oscillator, the output frequency of which is adjustable over a range of 250 to 500 cycles per second. Within these limits the accuracy of the output is satisfactory percentage wise, but at a lower frequency the error which may occur in either of the two oscillators used to produce the beat frequency bears too high a ratio to the output frequency, and the ratio becomes progressively worse as the beat frequency decreases. For example, an error of one part in 100,000 produces an error of one part in 500 for a beat frequency output of 500 cycles, which is reduced to one part in 100 when the beat frequency is reduced to 100 cycles. In this situation the range of the beat frequency may be limited to 250–500 cycles, within which it has the necessary accuracy, and a multivibrator is employed to obtain lower frequencies in the range 40–250 cycles, thus maintaining the accuracy within the required limits.

The output lead 76 of the beat frequency oscillator is coupled by means of a relatively large capacity condenser 77 to the control circuit 79 and to the auto transformer 78, by means of which control voltages may be impressed on the conductor 80 which are 180 degrees out of phase with the voltages in circuit 79.

The reference character S4 indicates a switch of any suitable type, comprising wipers or brushes 81, 82, and 83, each of which has a bank of eleven contacts associated therewith. The wipers are mounted on a common shaft and may be simultaneously advanced from contact to contact by means of a suitable knob or dial.

The multivibrator MV9 comprises a double triode 87, suitable grid and plate resistors, and plate-to-grid coupling capacities which are variable by means of the wipers 82 and 83 of switch S4. As can be clearly seen from the drawing, the wipers complete the plate-to-grid coupling circuits through a different pair of condensers in each position. The control circuit 79 includes the resistor 84. The control circuit 86 includes the resistor 85 and is adapted to be connected either to conductor 80 or to control circuit 79 by means of wiper 81 of switch S4.

The following table shows the condenser capacity used at each switch position, the division factor at each switch position, and the frequency range used at each position. The values given are not critical, in view of the wide limits of the multivibrator.

| Switch | Capacity | Division | Range |
|---|---|---|---|
|  | Milli-farads |  |  |
| 1 | .180 | 9 | 40– 42 |
| 2 | .175 | 7 | 42– 44 |
| 3 | .170 | 7 | 44– 45 |
| 4 | .165 | 7 | 45– 47 |
| 5 | .140 | 7 | 47– 50 |
| 6 | .13 | 6 | 50– 55 |
| 7 | .12 | 6 | 55– 61 |
| 8 | .11 | 5 | 61– 71 |
| 9 | .08 | 4 | 71– 91 |
| 10 | .06 | 3 | 91–135 |
| 11 | .03 | 2 | 135–250 |

In order to explain how the equipment is used, it will be assumed that an output frequency of 75 cycles per second is desired. Inspection of the table or chart shows that this frequency lies within the range 71–91 cycles, corresponding to the ninth switch position. The switch S4 is accordingly set at position #9. The operator now notes from the table that in position #9 the multivibrator divides by 4 and adjusts the beat frequency of the beat frequency oscillator until it equals the product of the desired frequency and the division factor, which is 300 cycles per second. This secures the desired output frequency, for if the applied control voltages have a frequency of 300 cycles per second, and if the multivibrator divides by 4, the output frequency will be 75 cycles per second. As another example, an output frequency of 44.75 cycles per second may be obtained by setting the switch to position #3 and by then adjusting the beat frequency to 313.25 cycles per second.

The equipment is exceptionally reliable due in part to the small frequency ranges that are actually used as compared to the ranges shown by test to be available at the various switch positions. For instance, in position #1, where the multivibrator has the smallest limits, the range shown by test to be available is about 11 cycles, although a range of only 2 cycles is used. It will be understood, of course, that the range selected for use at each switch position should center at about the same point as the available range.

What is considered new and desired to have protected by Letters Patent is pointed out in the appended claims.

What is claimed is:

1. In a frequency divider, a plurality of multivibrators arranged in tandem, each said multivibrator comprising two space discharge devices and each discharge device comprising cathode means, a grid, and a plate, resistances in the cathode plate circuits of said devices all having approximately the same value, resistances in the cathode grid circuits of said devices all having approximately the same value, condensers in each multivibrator by means of which the plate of each device is coupled to the grid of the other device, and means whereby each multivibrator except the last controls the next adjacent multivibrator at a sub-harmonic frequency, said last means comprising circuit connections conductive to direct current extending between adjacent multivibrators, the condensers in each multivibrator having a capacity value which bears a predetermined relation to its operating frequency when under control as set forth.

2. A frequency divider comprising a plurality of multivibrators arranged in tandem, each multivibrator including two space discharge devices each having cathode, grid, and plate elements and a condenser for coupling its plate to the grid of the other device, circuit means for transmitting control voltages of substantially unaltered wave form from each preceding multivibrator to each succeeding multivibrator to operate said succeeding multivibrators at progressively lower sub-harmonic frequencies, tuning elements in each succeeding multivibrator including said condensers whereby each multivibrator is tuned to a natural frequency enough lower than its operating frequency so that the natural frequency can never equal the operating frequency notwithstanding normal variations in the values of said elements, and means in each discharge device of each succeeding multivibrator for maintaining potential conditions on its grid such that the discharge device can amplify control voltages to initiate transients in the associated discharge device, the amplification factor being high enough so that transients are initiated at said sub-harmonic frequencies notwithstanding the fact that the multivibrators are tuned to lower frequencies.

3. In a frequency divider, a multivibrator comprising two space discharge devices each having cathode, grid, and plate elements and a condenser for coupling its plate to the grid of the other device, a plate resistor in the cathode plate circuit of each device, a grid resistor in the cathode grid circuit of each device, means for generating control voltages at a given frequency, control circuits over which said voltages are transmitted to said multivibrator to control the same at a sub-harmonic frequency, each said coupling condenser having a value which is approximately in the center of the range over which the value can be varied while the multivibrator operates at said sub-harmonic frequency and while the values of the plate and grid resistors and the control voltages remain unchanged, each plate resistor and each grid resistor likewise having a value which is approximately at the center of the range over which the value may be varied while the multivibrator continues to operate at said sub-harmonic frequency and while the values of the coupling condensers, the other resistors, and the control voltages remain unchanged, and all said values being coordinated to give each value substantially the maximum range, whereby any resistor or coupling condenser may be replaced by another having the same value within the range of commercial variation without affecting the operation of the multivibrator.

4. In combination, a controlled multivibrator comprising two triodes and having two incoming control circuits terminating in said triodes, respectively, each triode having elements so proportioned that it is adapted to amplify impulses received over its associated control circuit at times when the other triode is approaching a transient, means comprising a second multivibrator for generating and transmitting positive and negative impulses alternately over each control circuit, said control circuits having characteristics such that said impulses reach the controlled multivibrator substantially unchanged in wave form, means including coupling condensers whereby each triode transmits amplified positive impulses derived from negative impulses received over its associated control circuit to the other triode to initiate transients therein, the amplified positive impulses derived from negative impulses received over one control circuit being opposed or supplemented by impulses received over the other control circuit depending on whether the impulses in the two control circuits are in phase or not, and the amplification factor of said triodes being high enough so that at times when the amplified positive impulses are opposed by other impulses they still have sufficient amplitude to initiate transients as set forth.

5. In combination, a multivibrator comprising two triodes, each triode having means for amplifying control impulses at times when the grid in the adjacent triode is rising in potential, coupling circuits over which the amplified impulses are transmitted from each plate to the grid of the opposite triode, whereby regenerative impulses are produced if an amplified impulse raises the potential of the grid to which it is transmitted high enough to start current flow, said regenerative impulses being out of phase with the control impulses, and means for transmitting to said multivibrator control impulses of sufficiently long duration so that the regenerative impulses produce a cumulative effect thereon notwithstanding the difference in phase.

6. In a frequency divider, a high frequency multivibrator, a low frequency multivibrator, each multivibrator comprising two space discharge devices each having its plate coupled to the grid of the other device by means of a condenser, two control circuits extending between said multivibrators by means of which the low frequency multivibrator is caused to operate at a sub-harmonic frequency, said control circuits including means for transmitting control voltages without substantially decreasing the duration thereof, means for changing the phase relation between the voltages carried by said control circuits to change the operating frequency of the low frequency multivibrator from an even sub-harmonic to an odd sub-harmonic, or vice versa, and tuning elements in said low frequency multivibrator having such values that its natural frequency is lower than the lowest of said sub-harmonic frequencies.

7. In a frequency divider, a multivibrator comprising a pair of space discharge devices having their plate and grid elements cross coupled by condensers, two control circuits extending to said multivibrator, a second multivibrator for transmitting control voltages, means including said control circuits for transmitting said control voltages to said first multivibrator in substantially unchanged wave form, resistors in said control circuits for limiting said voltages while maintaining their wave form, and circuit elements in said first multivibrator having constants such that each discharge device is adapted to convert negative half waves of control voltage into amplified positive impulses for the initiation of transients in the other discharge device, said impulses having sufficient amplitude to initiate the transients far enough in advance of the time they would occur if the multivibrator were uncontrolled to cause the multivibrator to operate at a frequency which is at least twenty-five percent higher than its natural frequency.

8. In a frequency divider, a plurality of multivibrators, each comprising a pair of space discharge devices each having cathode means, a plate and a grid, resistances for connecting said cathode means to each plate, resistances for connecting said cathode means to each grid and condenser means for coupling each grid to the plate of the other discharge device, the resistance-capacity means in the plurality of multivibrators being proportioned so that the multivibrators may produce waves of harmonically related frequencies, and coupling means between the plates of one multivibrator and the plates of another vibrator for passing to said other multivibrator a wave having substantially the same shape as the wave produced by said one multivibrator.

9. In a frequency divider, a multivibrator comprising two space discharge devices each having cathode, grid, and plate elements and a condenser for coupling its plate to the grid of the other device, two control circuits incoming to said discharge devices, respectively, tuning elements in said multivibrator having values such that the natural frequency of said multivibrator is substantially lower than the desired operating frequency, each said discharge device constituting means for amplifying control impulses received over its associated control circuit and for transmitting such amplified impulses to the other discharge device through its coupling condenser, whereby regenerative impulses are produced in case an amplified impulse causes the device to which it is transmitted to become conductive, said regenerative impulses being out of phase with the initial control impulse to which they are responsive, and means for transmitting over said control circuits control impulses having a frequency which is a multiple of said desired operating frequency and which are of sufficiently long duration so that the regenerative impulses resulting from any control impulse produce a cumulative effect thereon notwithstanding the difference in phase.

THOMAS B. GIBBS.
MORRIS E. BROWN.
PARKER B. WICKHAM.